United States Patent [19]

Geczy et al.

[11] Patent Number: 4,720,199

[45] Date of Patent: Jan. 19, 1988

[54] BEARING STRUCTURE FOR DOWNHOLE MOTORS

[75] Inventors: Bela Geczy; James N. McPherson; Robert G. Toth, all of Orange, Calif.

[73] Assignee: Smith International, Inc., Newport Beach, Calif.

[21] Appl. No.: 903,229

[22] Filed: Sep. 3, 1986

[51] Int. Cl.⁴ .................... F16C 17/10; E21B 4/02
[52] U.S. Cl. .................... 384/282; 384/420; 384/912; 175/107
[58] Field of Search ............... 175/107, 104, 105, 410, 175/371; 252/12, 12.2; 384/92, 95, 303, 276, 420, 425, 907, 910, 282, 912; 29/149.5 R, 149.5 PM; 228/122, 135, 138, 185, 189

[56] References Cited

U.S. PATENT DOCUMENTS

| | | | |
|---|---|---|---|
| T102,901 | 4/1983 | Offenbacher | 384/95 |
| 2,331,584 | 10/1943 | Underwood | |
| 3,127,224 | 3/1964 | Owens et al. | |
| 4,017,480 | 4/1977 | Baum | 428/601 |
| 4,146,080 | 3/1979 | Baum | 164/97 |
| 4,410,054 | 10/1983 | Nagel et al. | 175/107 |
| 4,451,162 | 5/1984 | Shepherd | 384/95 |
| 4,468,138 | 8/1984 | Nagel | 384/303 |
| 4,549,820 | 10/1985 | Mullins | 384/95 |
| 4,560,014 | 12/1985 | Geczy | 175/107 |
| 4,620,601 | 11/1986 | Nagel | 175/107 |

FOREIGN PATENT DOCUMENTS 770060 3/1957 United Kingdom .
805638 12/1958 United Kingdom .

Primary Examiner—David Werner
Attorney, Agent, or Firm—Price, Gess & Ubell

[57] ABSTRACT

A unitary sleeve mounts both thrust and radial bearings, the radial bearing being fabricated of macro-crystalline tungsten carbide powder and cemented tungsten carbide cobalt chips in a recessed area on an elongated extension and the thrust bearing comprising a ring carrying diamond inserts residing in through holes, the ring and inserts being brazed on a hub at the thrust head end of the extension.

2 Claims, 13 Drawing Figures

BEARING STRUCTURE FOR DOWNHOLE MOTORS

The subject invention pertains to bearings and more particularly to an improved bearing structure for supporting the drive shaft of a downhole well drilling motor.

The design of bearing assemblies which will withstand the hostile environments and force loads typically encountered in down hole well drilling presents a continuing challenge to the industry. The high temperature, abrasive and erosive environment encountered preclude the successful application of sealed bearing technology as it currently exists. Thus, the prior art has turned to bearing structures exposed to the drilling fluids passing through the downhole motor.

In the prior art, two separate bearings have typically been provided to accomodate the forces on the drive shaft of the downhole motor. The bearings have been designed such that one radial bearing accomodates radial forces and the second, separate thrust bearing accomodates thrust loads. Typical bearing materials have included poly-crystalline diamonds, ceramics, and tungsten carbide matrix.

The separate bearing structures of the prior art have required two separate locking systems for attaching the bearings to the drive shaft. Under operating conditions, the mechanical connections have worn down and shortened the bearings' useful life. Accordingly, it has appeared desirable to provide an improved bearing which requires fewer parts and lower machining and servicing costs.

In the prior art, radial bearing surfaces employing tungsten carbide have been manufactured by molding tungsten carbide buttons to a steel radial bearing sleeve utilizing a fine tungsten carbide powder and copper base infiltrant. The buttons are affixed to the surface of the carbon mold in a predetermined pattern which, depending upon size, may utilize on the order of 300 buttons. Once molded into place, the buttons and surrounding matrix must be machine finished. The process of setting the buttons is relatively labor intensive. In addition, the tungsten carbide buttons are more expensive than tungsten carbide chip material.

Thrust bearings are known in the prior art which employ bearing inserts comprising hardmetal or carbide studs having planar, polycrystalline diamond faces. Bearings employing such inserts have provided a useful, but still limited, load carrying ability.

In manufacture, such diamond faced bearing inserts have been inserted into wells machined into associated bearing races and brazed into place. This procedure has the disadvantage that the wells must all be drilled to the same precise depth, in order to insure that the planar diamond bearing faces all lie in a common plane in the finished product.

Another drawback of this prior art approach is that replacement of worn or damaged bearing inserts is difficult. The structural member into which the bearing inserts are inserted may be very expensive. If the bearing inserts become worn, it may be impossible to replace them without destroying the utility of the associated structural member.

SUMMARY OF THE INVENTION

It is therefore an object of the invention to provide an improved bearing structure.

It is another object of the invention to eliminate mechanical connections between separate radial and thrust bearing assemblies as employed in the prior art.

It is yet another object of the invention to reduce manufacturing and servicing costs of tools employing such bearings.

It is another object of the invention to provide an improved method of fixing bearing inserts to a sleeve or other support structure.

It is another object of the invention to eliminate the necessity to drill holes of a precisely machined depth in order to fix bearing inserts in place.

It is another object of the invention to provide a bearing structure which facilitates replacement of bearing inserts, while minimizing deformation of associated parts.

It is another object of the invention to eliminate the expense involved in setting tungsten carbide buttons in prior art bearing structures.

According to the invention, the drawbacks of the prior art are eliminated and the objects of invention achieved by an extended bearing sleeve which provides a bearing body for both thrust and radial bearings. The thrust bearings comprise bearing inserts mounted in holes in a generally flat retainer. The holes pass entirely through the retainer, eliminating the necessity to create wells of a precisely drilled depth. The retainer and press-fitted bearing inserts form a subassembly which is attached to the bearing sleeve. The radial bearing comprises a chip matrix created from a mixture of macrocrystalline tungsten carbide powder and cemented tungsten carbide cobalt chips and molded to the bearing sleeve.

According to the preferred approach, the radial bearing surface is first applied to the extended sleeve in a recessed area thereof. Prior to finish machining, the diamond thrust bearing inserts and retainer ring are brazed into place.

BRIEF DESCRIPTION OF THE DRAWINGS

The just summarized invention will now be described in conjunction with the drawings of which.

DETAILED DESCRIPTION OF THE PREFERRED EMBODIMENT

Figure 1:
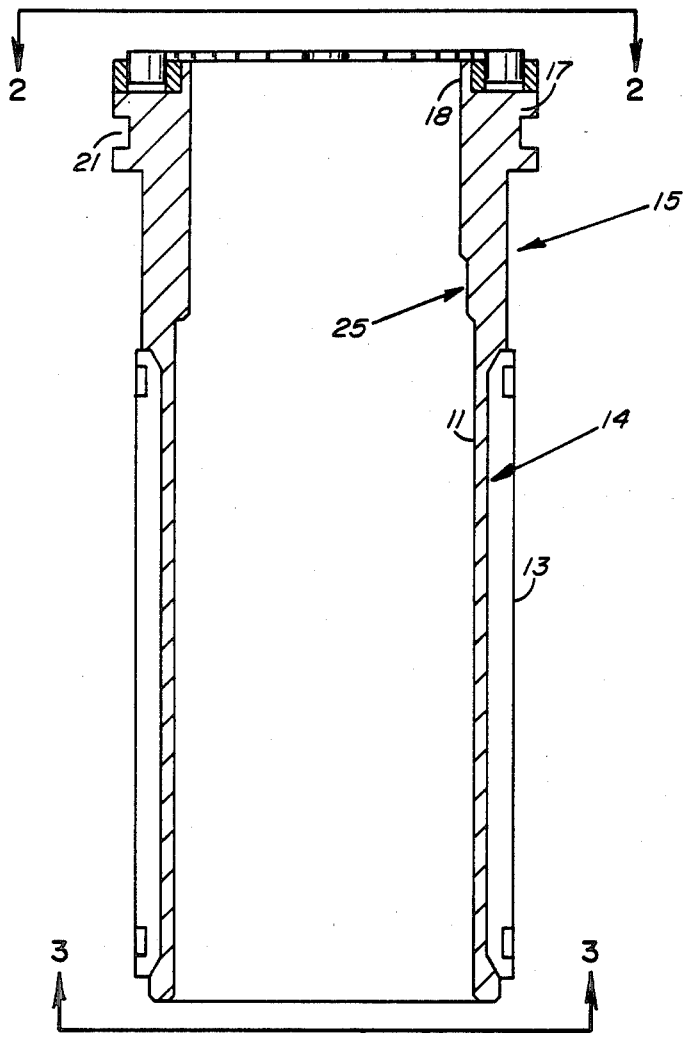
FIG. 1 is a crossection of a rotating bearing sleeve according to the preferred embodiment.

As shown in FIG. 1, the preferred embodiment includes a cylindrical steel bearing sleeve 11 which mounts a radial bearing surface 13 in a recessed area 14. The radial bearing surface 13 typically employs tungsten carbide inserts or a tungsten carbide chip matrix affixed to the steel sleeve 11.

Figure 4:
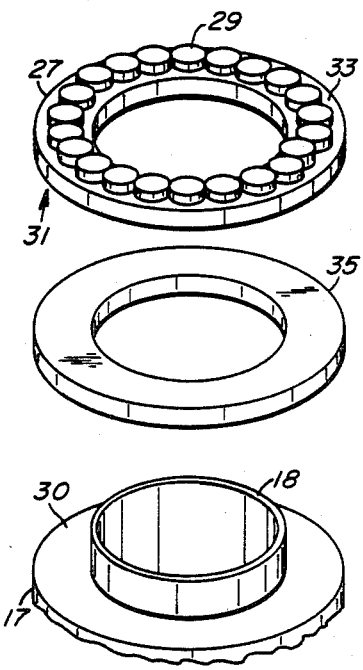
FIG. 4 is a perspective view illustrating the preferred embodiment.
Figure 2:
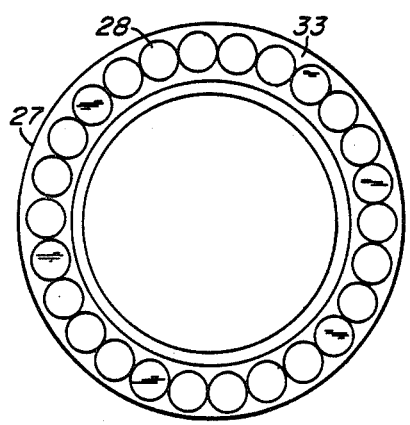
FIG. 2 is a view taken at 2—2 of FIG. 1.
Figure 3:
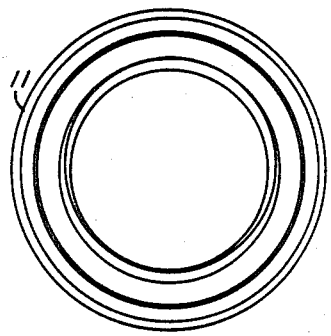
FIG. 3 is a view taken at 3—3 of FIG. 1.

As further illustrated, the steel sleeve 11 includes an extension 15. The extension 15 has a thrust head 17 at its end having a hub 18 for mounting a thrust bearing insert assembly (FIG. 4). The outer surface of the thrust head 17 may also include a recessed annular assembling groove 21. Such a groove may be provided to interact with a pulling tool to remove the bearing sleeve from a drive shaft.

The steel sleeve extension 15 further includes an eccentric interior ring 25 for locking the sleeve 11 to a drive shaft. The cooperating drive shaft (not shown) also bears an eccentric ring. In order to lock the sleeve 11 to the drive shaft, the bearing sleeve is placed on the drive shaft and rotated with respect thereto.

A thrust bearing insert assembly according to the preferred embodiment of the invention is shown in FIG. 4. The bearing includes an annular ring 27, having a number of bearing inserts or "buttons" 29 press fitted into holes 28 in the ring. The inserts 29 are preferably tungsten carbide studs having a polycrystalline diamond surface layer. On the stationary thrust bearing (not shown), the inserts 29 are appropriately spaced facilitating the flow of cooling fluid.

The tolerance of the holes 28 is ±0.0005 inches, to facilitate press-fitting of the inserts 29 into the ring 27. The ring 27 and press-fitted inserts 29 comprise a subassembly 31.

The subassembly 31 is positioned over a race 30 by a hub 18 and is rigidly attached to the race 30. Such subassemblies 31 may be manufactured in a desired quantity and stored for use, for example, when it is desired to refurbish apparatus returned from the field.

To attach the subassembly 31 to the race 30, a brazing ring 35 is placed on the race 30. A subassembly 31 is then placed on the brazing ring 35. The sleeve 11, subassembly 31, and brazing ring 35 are then heated, for example by induction heating, to an appropriate brazing temperature, of approximately e.g. 1200° F. When the brazing ring 35 melts, capillary action occurs causing the brazing material to rise up around the inserts 29 and thereby attach them to the ring 27 concurrently with the attachment of the ring 27 and inserts 29 to the race 30. This process is facilitated by the different coefficients of expansion of the steel ring 27 and tungsten carbide inserts 29.

If it is desired to refurbish the bearing, for example, upon return from the field, the structure may simply be reheated and the subassembly 31 removed. A new subassembly 31 may then be brazed into place. According to this method, valuable supporting structures to which the subassembly 31 has been attached may be preserved and recycled.

The radial bearing surface 13 preferably comprises macro-crystalline tungsten carbide powder blended together with cemented tungsten carbide cobalt chips. The mixture is preferably comprised of sixty percent (60%) by weight of 80 mesh and down macro-crystalline tungsten carbide, commercially available as the Kenametal product designated P-90. The range of particle sizes, i.e. 80 mesh and down, is selected for optimum packing density of the mixture.

The other component of the mixture is forty percent (40%) by weight of cemented tungsten carbide cobalt chips, for example TCM 10/18 mesh crushed WC-Co C grade. A suggested range for the percentage of weight of tungsten carbide cobalt chips is from forty to eighty percent (40-80%), with the preferred percentage being forty percent (40%).

Figure 12:
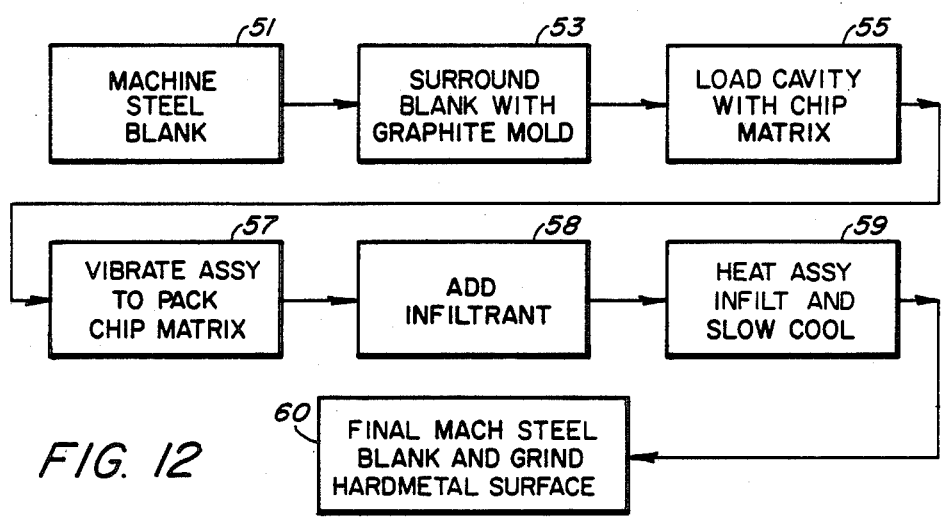
FIG. 12 is a flow chart illustrating the process of manufacturing a radial bearing surface like that of the preferred embodiment.

Steps in the process of manufacturing the radial bearing surface are illustrated in FIG. 12. To create a bearing surface, a steel blank is first machined (step 51) and then surrounded by a graphite mold (step 53). The blended mixture is loaded into a cavity 61 (e.g. FIG. 13) created between the steel blank 63 and graphite mold, step 55. The mold contents are then vibrated, step 57, for maximum density of the blended mixture. Copper infiltrant nuggets are then inserted in the mold at step 58.

The mold contents are then heated to 2050 degrees Fahrenheit (F.), plus or minus 25 degrees F., for example by induction heating, step 59. The heated powder mixture in the cavity 61 is infiltrated through capillary action with copper base infiltrant, step 59 and slow cooled to room temperature. After cooling, the parts are machined to specific dimensions by grinding, step 60.

Figure 13:
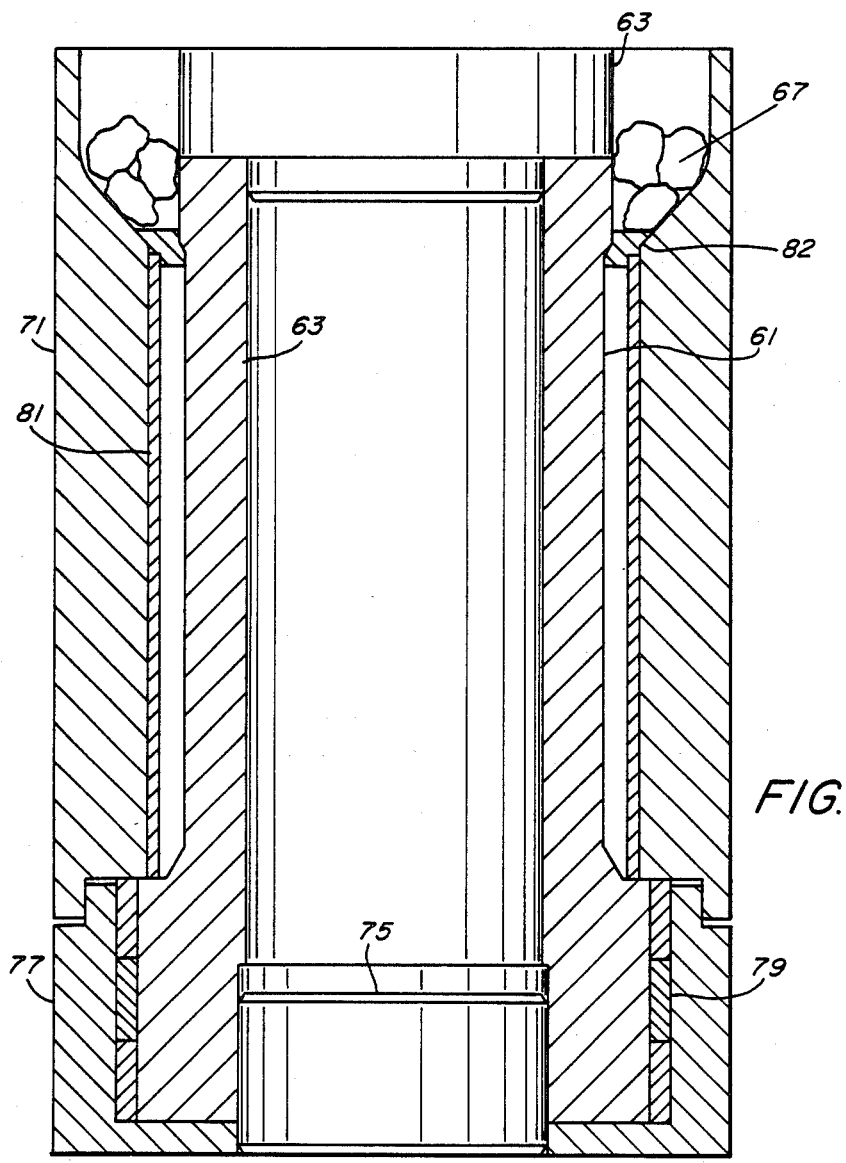
FIG. 13 illustrates the use of a graphite mold and steel blank in the process of FIG. 12.

FIG. 13 illustrates a particular set-up for use in the subject process for applying a bearing surface to the outer surface of a cylindrical steel bearing blank 63. The apparatus includes a mold body 71, a mold cap 73 and a mold plug 75. The mold body 71 rests in a mold base 77 and is separated from the bearing blank 63 by graphite fiber 79. On the larger sizes, graphite fiber 81 also lines the inner wall of the mold body 71. The infiltrant 67 is separated by a layer of tungsten powder 82 from the cavity 61 which contains the blended mixture of tungsten carbide powder and cemented tungsten carbide cobalt chips. The tungsten powder when infiltrated facilitates machining of the end of the sleeve 63.

In manufacture, the radial bearing surface 13 is applied to the steel sleeve 11 (FIG. 1) before insertion of the thrust bearing elements 29, because a higher temperature is required in the process of applying the radial bearing surface than is required to braze the diamond thrust bearing elements into place.

Figure 5:
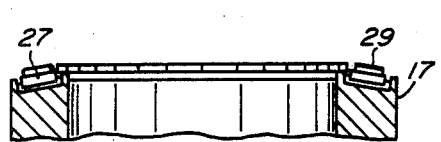
FIG. 5 is a crossectional drawing of an alternate embodiment.
Figure 6:
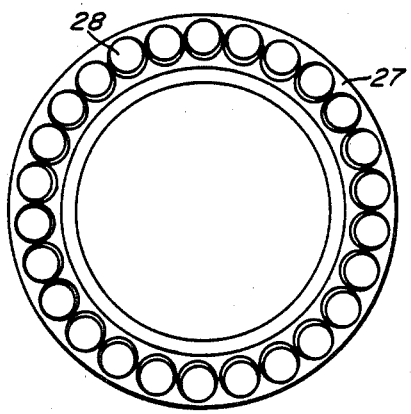
FIG. 6 is a view of one end of the embodiment of FIG. 5.
Figure 7:
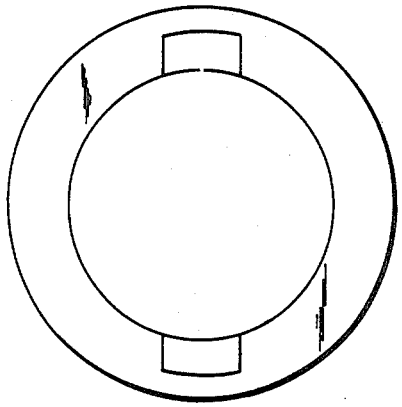
FIG. 7 is a view of the opposite end of the embodiment of FIG. 5.

FIGS. 5-7 illustrate an alternate embodiment of a thrust bearing insert retainer. In this embodiment, the ring 27 has been uniformly bent around its circumference to dispose the bearing inserts 29 at an angle to the centerline of the sleeve 11. Such a bend may be imparted to a flat ring, for example, by use of a standard press. The angled inserts 29 provide a bearing which accomodates both thrust and radial forces.

Figure 9:
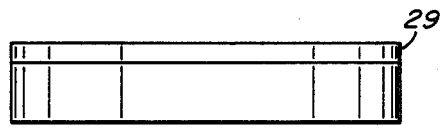
FIGS. 8 and 9 illustrate a prior art stud vs. the button insert of the preferred embodiment.
Figure 8:
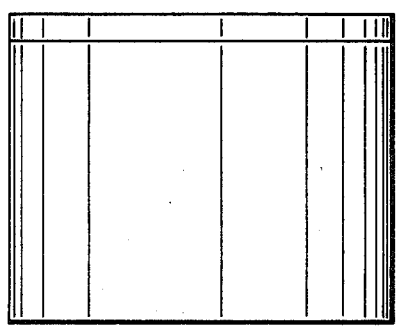

FIGS. 8 and 9 illustrate the relative size reduction in the bearing inserts or "studs" which may be realized by use of the ring subassembly according to the invention rather than the prior art approach of drilling non-through holes or "wells" to accomodate studs such as those shown in FIG. 8. The prior art technique requires the longer stud of FIG. 8 to gain proper support from the surrounding steel.

The surface 33 of the ring 31 surrounding the inserts 29 may be coated with a wear resistant substance to reduce wear caused by drilling fluids in a downhole drilling environment. One such material is tungsten carbide. Such coating is facilitated by the disclosed subassembly structure of the preferred embodiment because the coating can be applied before or after the joining process.

Figure 10:
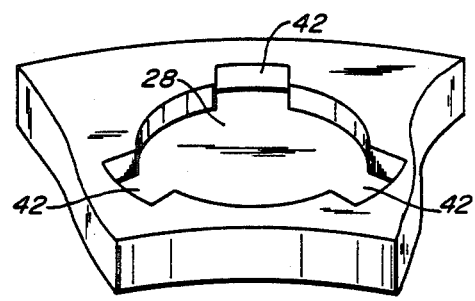
FIG. 10 illustrates an alternate hole structure.

FIG. 10 illustrates an alternate structure for the holes 14. This structure employs recessed areas 42. Such areas 42 could accomodate brazing material, for example in an embodiment wherein capillary action was not sufficient to achieve proper brazing of the button inserts 29.

Figure 11:
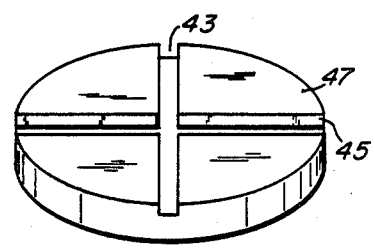
FIG. 11 illustrates an improved bearing insert.

FIG. 11 illustrates an improved bearing insert 13 wherein cross channels 43, 45 have been scribed into the diamond bearing surface 47, for example by the preferred mode of EDM (electro discharge machining). These channels 43, 45 increase fluid flow and attendant cooling across the bearing surface, resulting in a suprising and significant increase in the load carrying ability of the bearing surface without failure.

The channels 43, 45 are preferably one-thirty second of an inch by one-thirty second of an inch deep. It is also preferred that the inserts' bearing surface 47 extend about one-thirty second to one-sixteenth of an inch above the support ring 27. This spacing creates optimum fluid flow around the inserts 29. It is preferred that the space between the inserts 29 is such as to provide a velocity of fluid flow in the range of fifty to one hundred feet per second. This range provides the maximum rate of cooling without erosion of the bearing support structure.

It may be observed that a single fluid flow channel, e.g. 43, can provide significantly improved performance, believed to result from elimination of a dead zone in the cooling fluid flow pattern about the inserts 29. The cross channels 43, 45 provide even better performance.

To summarize, in the preferred embodiment, the thrust bearing retainer comprises a flat ring having an array of holes into which bearing inserts are press-fitted. A brazing washer is placed between the ring and a bearing race surface. Upon heating, the brazing material is drawn up and around the press-fitted bearing inserts by capillary action, thus permitting a one step attachment of the inserts to both the ring and the race.

In addition to the one-step attachment feature, an additional advantage of the invention is that the size of the studs carrying the polycrystalline diamond bearing surface may be cut in height by about one-half, resulting in about a 40% cost savings in the cost of the inserts. Another advantage is that the ring and press-fit elements may be manufactured as a subassembly, which considerably simplifies manufacturing and further reduces cost. More accurate alignment of the planar diamond faces also is attainable.

The radial bearing is fabricated of macro crystalline tungsten carbide powder and cemented tungsten carbide cobalt chips. The blend is such that the mixture of powders may be loaded in a cavity surrounding a steel blank and infiltrated with a copper base infiltrant and cooled to provide a bearing surface ready for finishing. The resultant chip matrix may be molded closer to final size, therefore requiring less time to finish compared to the prior art button structure. An additional advantage is that the percentage of tungsten carbide bearing surface area is increased over the molded button approach.

All of the foregoing advantages contribute a vastly improved bearing structure. Those skilled in the art will appreciate that many modifications and adaptations of the disclosed bearing structure may be derived without departing from the scope and spirit of the invention. Therefore, it is to be understood that, within the scope of the appended claims, the invention may be practiced other than as specifically described herein.

What is claimed is:

1. A bearing structure for mounting to a drive shaft comprising:

a generally cylindrical unitary bearing sleeve having an annular surface at one end thereof said annular surface being positioned concentrically about the axis of said cylindrical unitary bearing sleeve;

a radial bearing surface attached to said sleeve, said radial bearing surface comprising a blend of macro-crystalline tungsten carbide powder and cemented tungsten carbide cobalt chips in a copper base infiltrant;

a generally planar retainer ring having a number of through holes therein;

a plurality of polycrystalline diamond faced thrust bearing inserts, one mounted in each of said through holes; and brazing material rigidly bonding said ring and said inserts to said annular surface, concentric with said axis, and rigidly bonding said inserts to said ring.

2. A bearing structure adapted for mounting to a drive shaft comprising:

a unitary bearing sleeve for attachment to said drive shaft having an elongated recessed cylindrical outer surface of a first diameter, said sleeve widening in thickness beyond said recessed area to form a thrust head having an annular end surface with a cylindrical hub extending therefrom;

a generally cylindrical radial bearing attached to said sleeve in said recessed cylindrical area, said radial bearing comprising a blend of macro-crystalline tungsten carbide powder and cemented tungsten carbide cobalt chips in a copper base infiltrant;

a generally planar annular retainer ring having a plurality of through holes therein, said ring having a cylindrical center opening, said opening fitting over said hub;

a plurality of polycrystalline diamond faced thrust bearing inserts one mounted in each of said through holes; and brazing material rigidly bonding said ring and said inserts to said annular surface of said thrust head and rigidly bonding said inserts to said ring.

* * * * *